US009625001B2

(12) United States Patent
Jimenez Perez Mitre et al.

(10) Patent No.: US 9,625,001 B2
(45) Date of Patent: Apr. 18, 2017

(54) SPRING RETAINER PLATE WITH LANCED SPRING STOPS

(71) Applicant: Schaeffler Technologies AG & Co. KG, Herzogenaurach (DE)

(72) Inventors: Alfredo Jimenez Perez Mitre, Wooster, OH (US); Brian C. Zaugg, Millersburg, OH (US); Victor Norwich, Columbus, OH (US); Joshua David Cerreta, Copley, OH (US); Frank Wolf, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 107 days.

(21) Appl. No.: 14/614,009

(22) Filed: Feb. 4, 2015

(65) Prior Publication Data
US 2015/0260257 A1    Sep. 17, 2015

Related U.S. Application Data

(60) Provisional application No. 61/952,370, filed on Mar. 13, 2014.

(51) Int. Cl.
*F16F 15/134* (2006.01)
*F16H 45/02* (2006.01)
(Continued)

(52) U.S. Cl.
CPC .... *F16F 15/13453* (2013.01); *F16F 15/1207* (2013.01); *F16F 15/1217* (2013.01);
(Continued)

(58) Field of Classification Search
CPC ............. F16F 15/13453; F16F 15/1213; F16F 15/1232; F16H 45/02; F16H 2045/0278;
(Continued)

(56) References Cited

U.S. PATENT DOCUMENTS 4,890,706 A * 1/1990 Miura ...................... F16D 47/06
192/3.28
5,209,330 A   5/1993 Macdonald
(Continued)

FOREIGN PATENT DOCUMENTS

JP    2013087871    5/2013

*Primary Examiner* — Ramya Burgess
*Assistant Examiner* — Lillian Nguyen
(74) *Attorney, Agent, or Firm* — Chester Paul Maliszewski

(57) ABSTRACT

A torsional vibration damper, including: an axis of rotation; a drive plate; an output flange; and a spring retainer plate including a first side facing in a first axial direction, a second side facing in a second axial direction, and a plurality of spring stops formed of a same material forming the spring retainer plate. Each spring stop: extends from the first side at least partially in the first axial direction; and includes first and second circumferentially separated end surfaces separated, in the first axial direction, from the first side by first and second gaps, and a plurality of springs. Each spring includes a first circumferential end engaged with a respective first end surface and a second circumferential end engaged with a respective second end surface. The spring retainer plate partially surrounds the plurality of springs and retains the plurality of springs in a radially outward direction.

20 Claims, 9 Drawing Sheets

(51) Int. Cl.
*F16F 15/12* (2006.01)
*F16F 15/121* (2006.01)
*F16F 15/123* (2006.01)

(52) U.S. Cl.
CPC ....... *F16F 15/12313* (2013.01); *F16H 45/02* (2013.01); *F16H 2045/0205* (2013.01); *F16H 2045/0215* (2013.01); *F16H 2045/0231* (2013.01); *F16H 2045/0263* (2013.01); *F16H 2045/0278* (2013.01)

(58) Field of Classification Search
CPC ..... F16H 2045/0263; F16H 2045/0205; F16H 2045/0215; F16H 2045/0231
See application file for complete search history.

(56) References Cited

U.S. PATENT DOCUMENTS

| | | | |
|---|---|---|---|
| 5,868,228 A * | 2/1999 | Fukushima | F16F 15/1203 192/205 |
| 6,675,457 B1 | 1/2004 | Redmond et al. | |
| 7,585,226 B2 | 9/2009 | Uhler et al. | |
| 2007/0137963 A1 | 6/2007 | Maienschein et al. | |
| 2010/0133062 A1 * | 6/2010 | Maienschein | F16F 15/12366 192/30 V |
| 2010/0187066 A1 * | 7/2010 | Kneidel | F16D 3/12 192/203 |
| 2011/0011691 A1 * | 1/2011 | Tomiyama | F16H 45/02 192/3.29 |
| 2011/0247322 A1 * | 10/2011 | Lindemann | F16F 15/1343 60/338 |
| 2012/0208648 A1 * | 8/2012 | Takikawa | F16H 45/02 464/68.8 |
| 2013/0048459 A1 * | 2/2013 | Matsuoka | F16H 45/02 192/55.6 |
| 2013/0233665 A1 * | 9/2013 | Vanni | F16D 33/18 192/3.28 |
| 2013/0324267 A1 | 12/2013 | Blough | |
| 2014/0076682 A1 * | 3/2014 | Grieco | F16F 15/12313 192/30 V |
| 2014/0251746 A1 * | 9/2014 | Ito | F16F 15/134 192/70.11 |

* cited by examiner

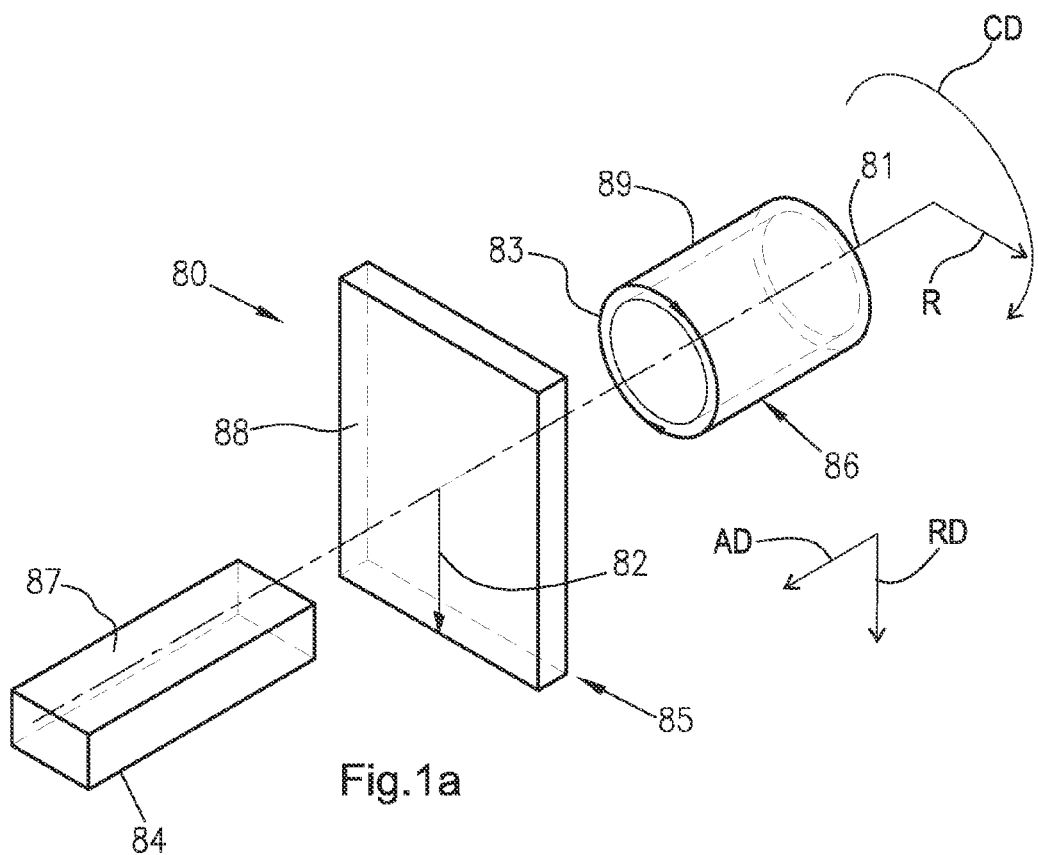
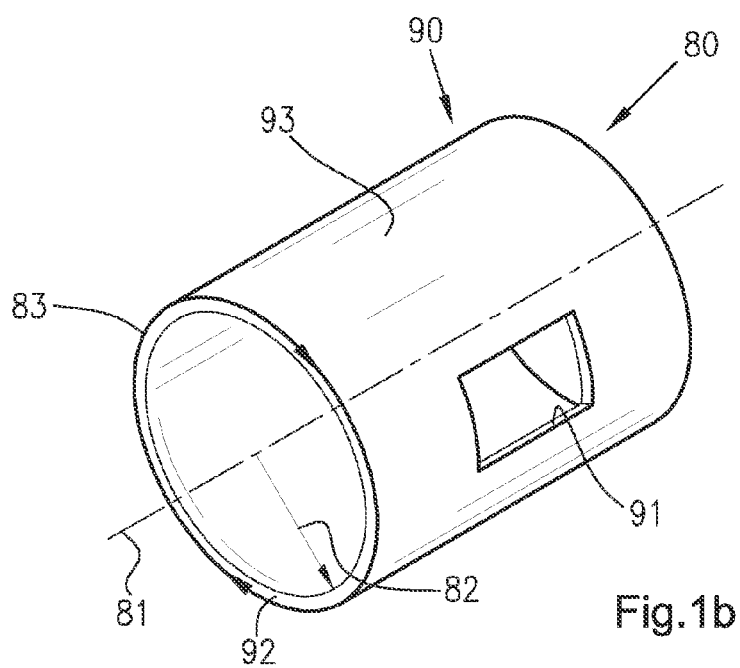

SPRING RETAINER PLATE WITH LANCED SPRING STOPS

CROSS-REFERENCE TO RELATED APPLICATIONS

This application claims the benefit under 35 U.S.C. §119(e) of U.S. Provisional Patent Application No. 61/952,370, filed Mar. 13, 2014, which application is incorporated herein by reference in its entirety.

TECHNICAL FIELD

The present disclosure relates generally to a spring retainer plate with lanced spring stops, in particular, stops formed integrally with the plate and extending outward from a side of the plate.

BACKGROUND

FIG. 10 is a partial cross-sectional view of prior art spring retainer 200, for example, for a vibration damper. A circumferential end of a spring (not shown), or an end-cap (not shown) for a spring engages portion 202 of retainer to circumferentially fix the spring. Ideally, the end cap and spring should remain in circumferential alignment, with the end cap substantially co-planar with a plane passing through an axis of rotation for the spring retainer. However, portion 202 is rounded. As a result, the spring and/or end-cap are able to slip and/or twist, resulting in damaging bending stresses for the spring and/or end cap. It is known to use a separate component, fixed to a spring retainer plate, to form a spring stop for the plate. However, the use of multiple components increases the cost, complexity, and fabricating time for the plate.

SUMMARY

The present disclosure broadly comprises a torsional vibration damper, including: an axis of rotation; a drive plate arranged to receive torque; an output flange; a spring retainer plate including: a first side facing in a first axial direction; a second side facing in a second axial direction opposite the first axial direction; first and second pluralities of holes passing through material forming the spring retainer plate and connecting the first and second sides and aligned with each other in a circumferential direction; and a first plurality of spring stops, each spring stop in the first plurality of spring stops: formed of a same material forming a remainder of the spring retainer plate; bounded, in the circumferential direction, by a respective pair of holes from the first and second pluralities of holes and extending from the first side at least partially in the first axial direction; and a first plurality of circumferentially disposed springs engaged with the drive plate and the first plurality of spring stops. The spring retainer plate is arranged to partially surround the first plurality of springs and retain the first plurality of springs in a radially outward direction.

The present disclosure broadly comprises a torsional vibration damper, including: an axis of rotation; a drive plate; an output flange; a spring retainer plate including: a first side facing in a first axial direction; a second side facing in a second axial direction opposite the first axial direction; a first plurality of spring stops, each spring stop in the first plurality of spring stops formed of a same material forming a remainder of the spring retainer plate, extending from the first side at least partially in the first axial direction, including respective first and second circumferentially separated end surfaces separated, in the first axial direction, from the first side by first and second respective gaps; and a first plurality of springs, each spring in the first plurality of springs including a respective first circumferential end engaged with a respective first end surface and a respective second circumferential end engaged with a respective second end surface. The spring retainer plate is arranged to partially surround the first plurality of springs and retain the first plurality of springs in a radially outward direction.

The present disclosure broadly comprises torque converter, including: an axis of rotation; a cover; an impeller; a turbine; a stator; and a torsional vibration damper including: a drive plate; an output flange; a spring retainer plate including: a first side facing in a first axial direction away from the turbine, a second side facing in a second axial direction toward the turbine, first and second pluralities of holes passing through material forming the spring retainer plate and connecting the first and second sides and aligned with each other in a circumferential direction, and a first plurality of spring stops, each spring stop in the first plurality of spring stops formed of a same material forming a remainder of the spring retainer plate, bounded, in the circumferential direction, by a respective pair of holes from the first and second pluralities of holes, and extending from the first side at least partially in the first axial direction; and a first plurality of circumferentially disposed springs engaged with the drive plate and the first plurality of spring stops. The torque converter includes a lock-up clutch arranged to non-rotatably connect the cover and the drive plate. The spring retainer plate is arranged to partially surround the first plurality of springs and retain the first plurality of springs in a radially outward direction. In a cross-section, orthogonal to the axis of rotation, of said each spring stop in the first plurality of spring stops; the spring retainer plate is continuous.

BRIEF DESCRIPTION OF THE DRAWINGS

The nature and mode of operation of the present disclosure will now he more fully described in the following detailed description of the present disclosure taken with the accompanying figures, in which:

FIG. 1A is a perspective view of a cylindrical coordinate system demonstrating spatial terminology used in the present application;

FIG. 1B is a perspective view of an object in the cylindrical coordinate system of FIG 1A demonstrating spatial terminology used in the present application;

DETAILED DESCRIPTION

Figure 2:
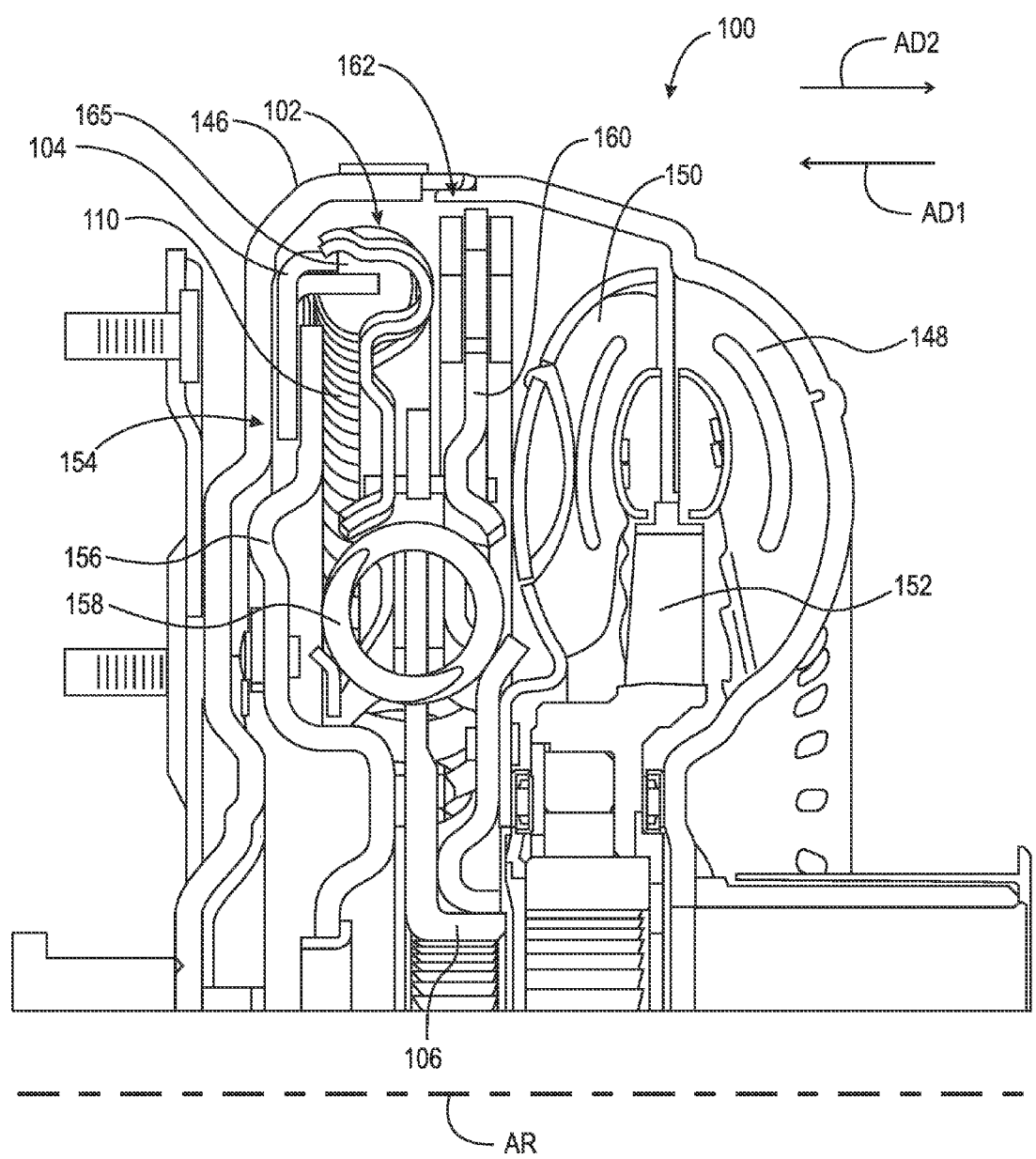
FIG. 2 is a partial cross-sectional view of a torque converter including a torsional vibration damper with lanced spring stops.

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should he understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should he appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

FIG. 1A is a perspective view of cylindrical coordinate system 80 demonstrating spatial terminology used in the present application. The present invention is at least partially described within the context of a cylindrical coordinate system. System 80 has a. longitudinal axis 81, used as the reference for the directional and spatial terms that follow. Axial direction AD is parallel to axis 81. Radial direction RD is orthogonal to axis 81. Circumferential direction CD is defined by an endpoint of radius R (orthogonal to axis 81) rotated about axis 81.

To clarify the spatial terminology, objects 84, 85, and 86 are used. Surface 87 of object 84 forms an axial plane. For example, axis 81 is congruent with surface 87. Surface 88 of object 85 forms a radial plane. For example, radius 82 is congruent with surface 88. Surface 89 of object 86 forms a circumferential surface. For example, circumference 83 is congruent with surface 89. As a further example, axial movement or disposition is parallel to axis 81, radial movement or disposition is orthogonal to axis 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner, Object 90 includes axial surface 91, radial surface 92, and circumferential surface 93. Surface 91 is part of an axial plane and surface 92 is part of a radial plane.

FIG. 2 is a partial cross-sectional view of torque converter 100 including torsional vibration damper 102 with lanced spring stops.

Figure 3:
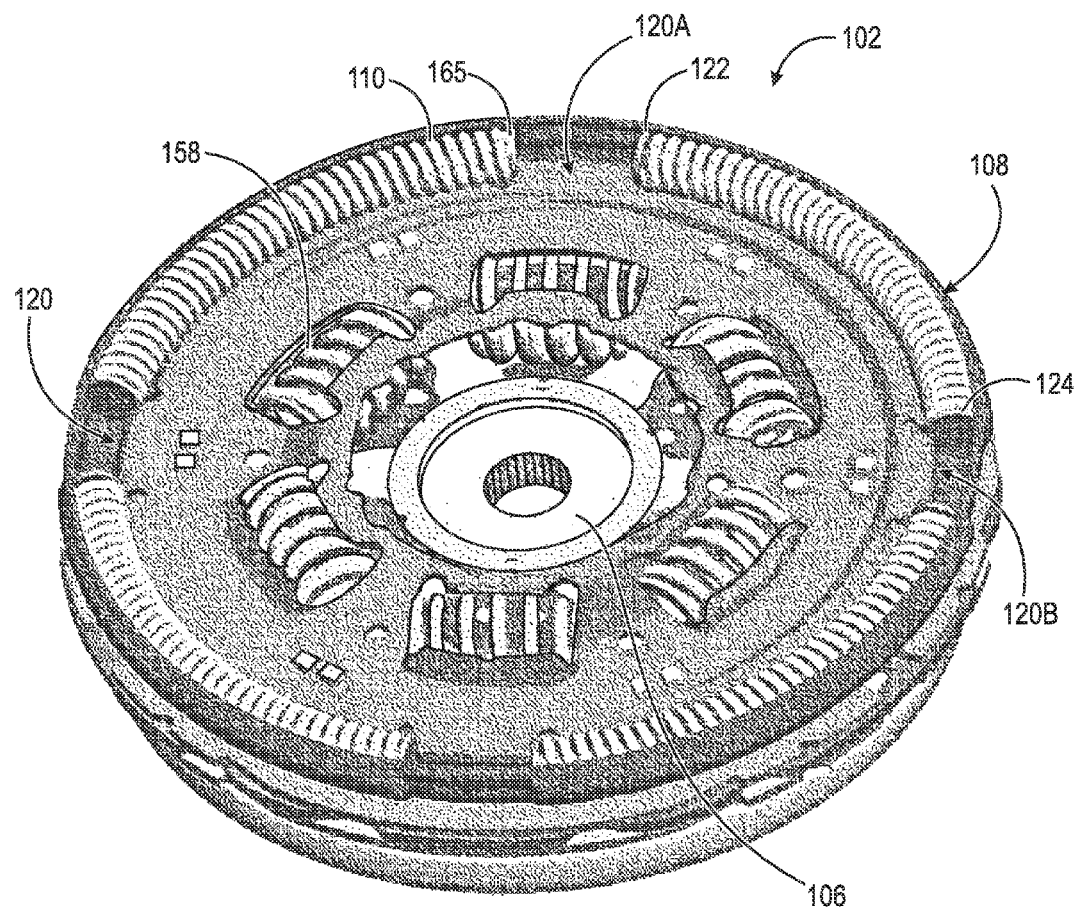
FIG. 3 is a front view of portions of the damper shown in FIG. 2.

FIG. 3 is a front view of portions of damper 102 shown in FIG. 2.

Figure 4:
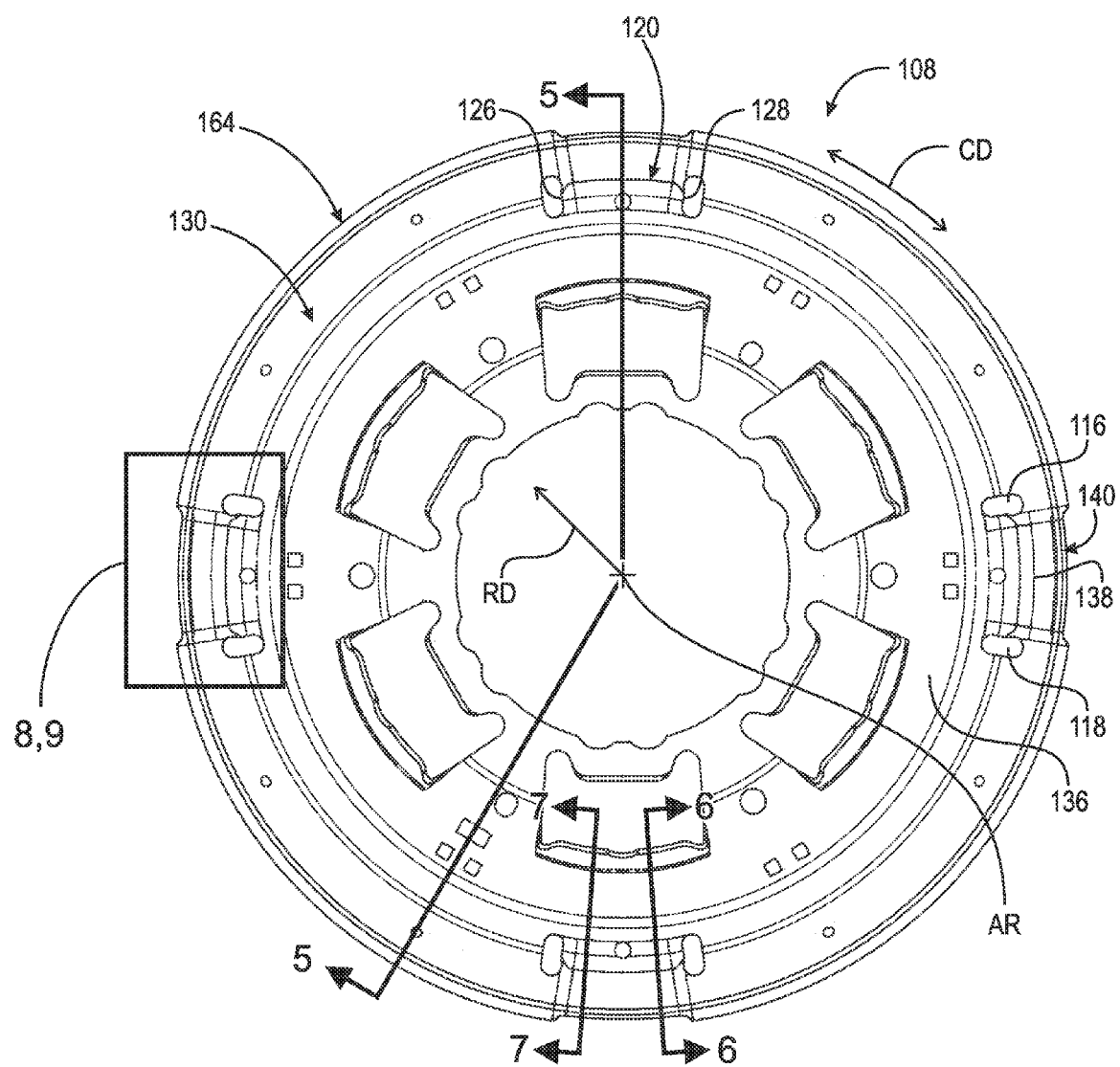
FIG. 4 is a front view of the spring retainer plate shown in FIG. 2.

FIG. 4 is a front view of the spring retainer plate shown in FIG. 2.

Figure 5:
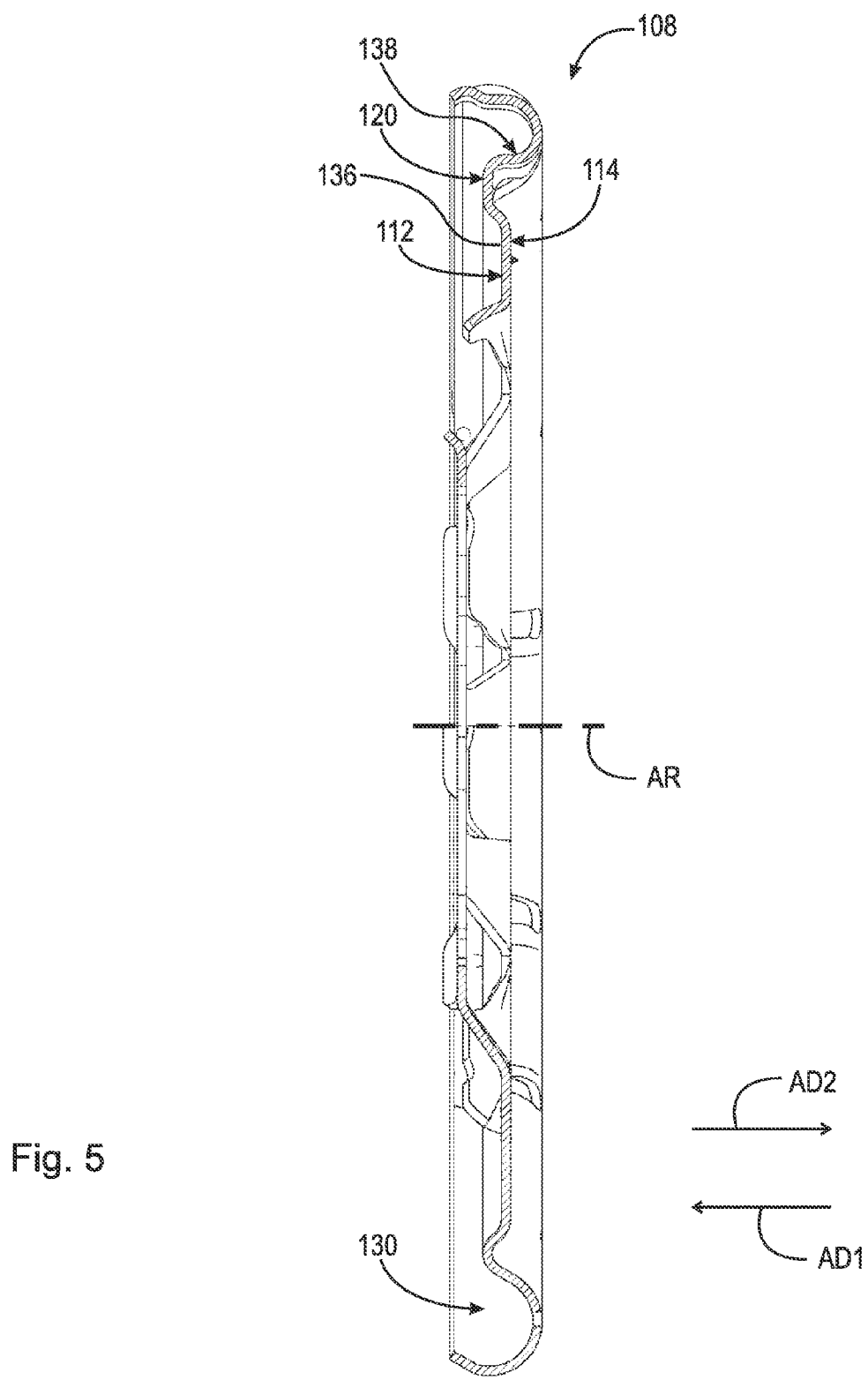
FIG. 5 is a cross-sectional view generally along line 5-5 in FIG. 4.

FIG. 5 is a cross-sectional view generally along line 5-5 in FIG. 4.

Figure 6:
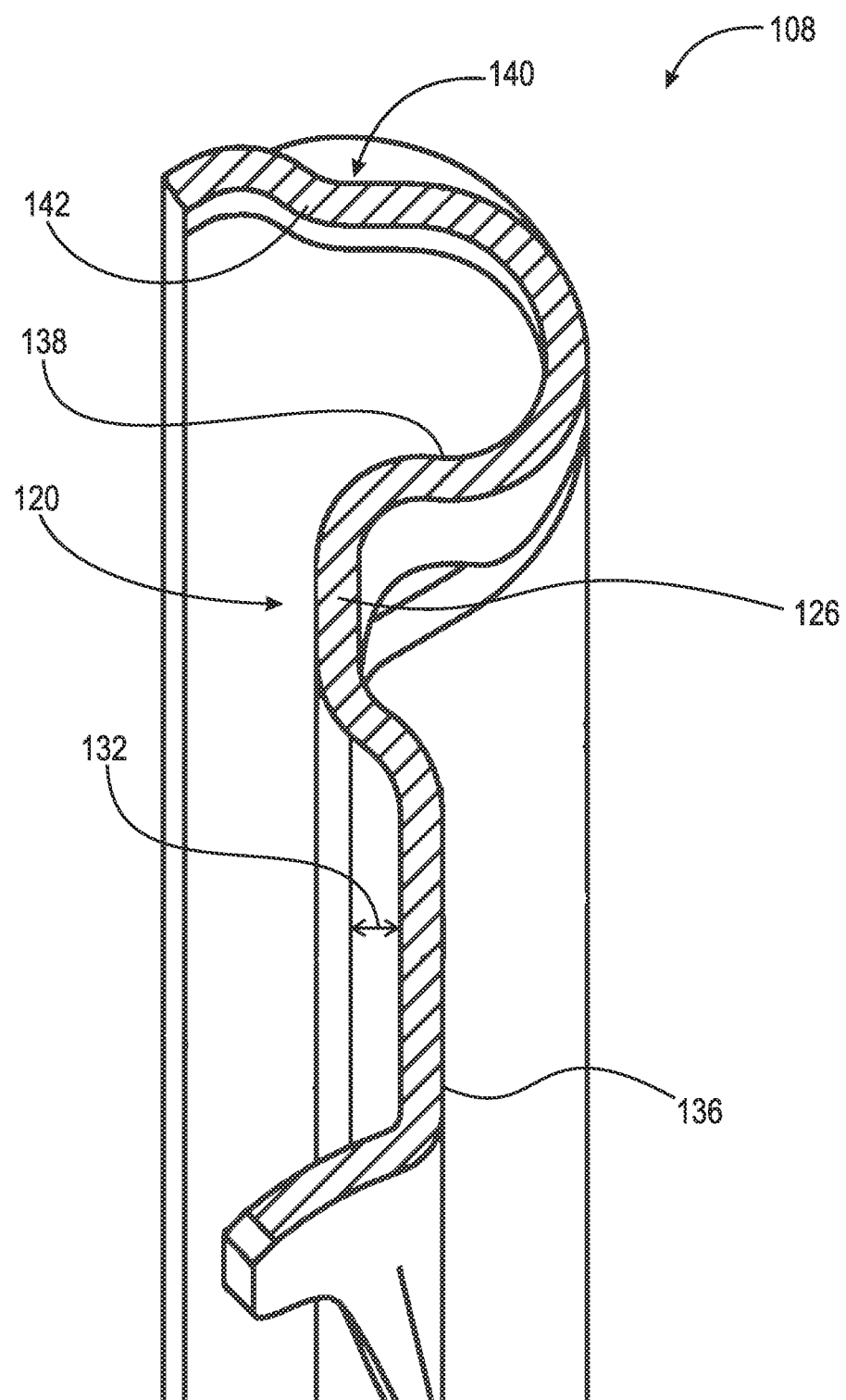
FIG. 6 is a cross-sectional view generally along line 6-6 in FIG. 4.

FIG. 6 is a cross-sectional view generally along line 6-6 in FIG. 4.

Figure 7:
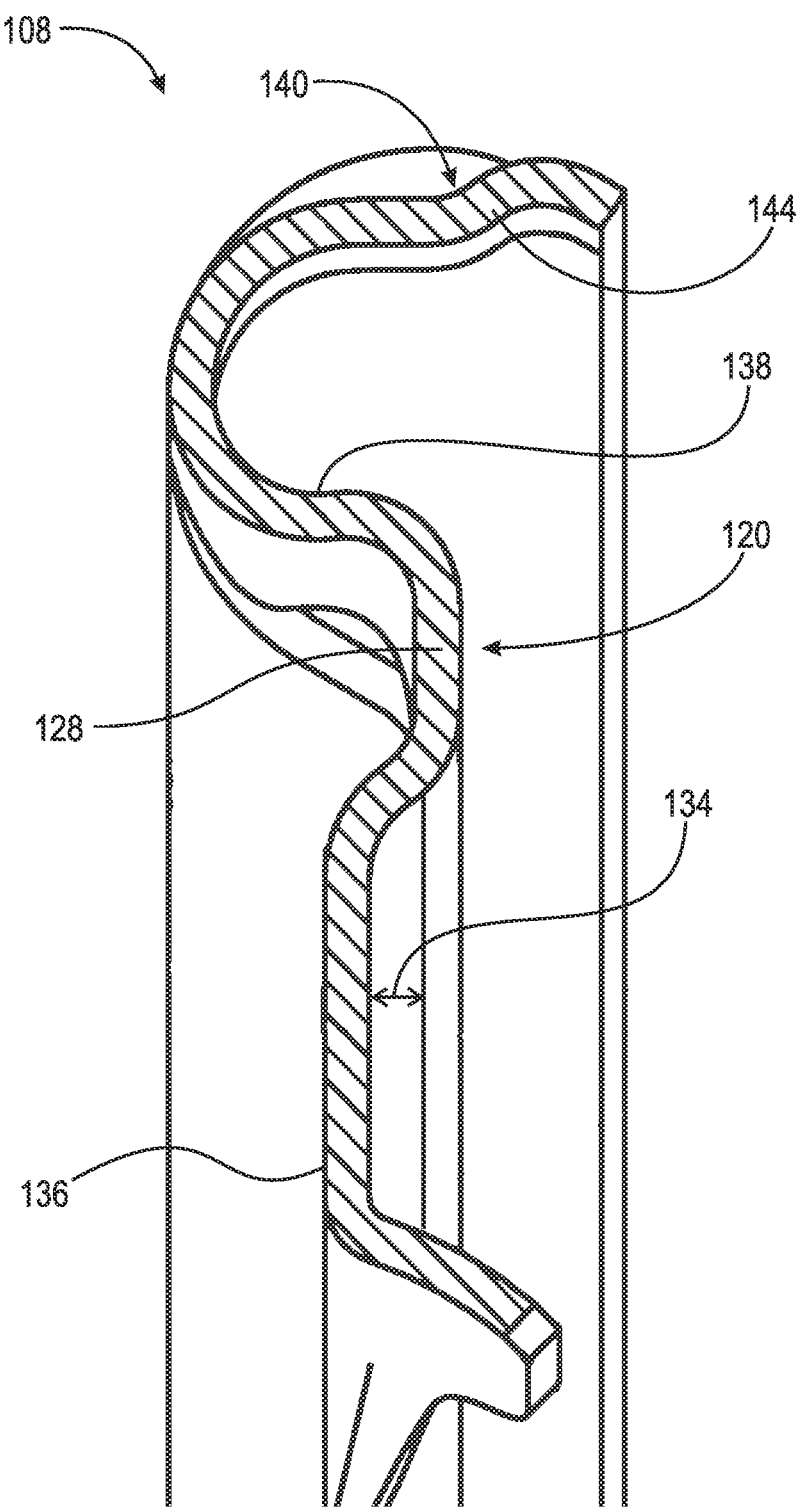
FIG. 7 is a cross-sectional view generally along line 7-7 in FIG. 4.

FIG. 7 is a cross-sectional view generally along line 7-7 in FIG. 4. The following should be viewed in light of FIGS. 2 through 7. Damper 102 includes axis of rotation AR, drive plate 104 arranged to receive torque, output flange 106, spring retainer plate 108, and springs 110. Spring retainer plate 108 includes side 112 facing axial direction AD1 and side 114 facing axial direction AD2, opposite direction AD1. Plate 108 includes holes 116 and 118 passing through material forming retainer plate 108, connecting sides 112 and 114, and aligned in circumferential direction CD.

Spring retainer plate 108 includes spring stops 120. To simplify the presentation, the discussion that follows is directed to a single stop 120 unless noted otherwise; however, it should be understood that the discussion is applicable to each stop 120. Stop 120 is bounded in direction CD by holes 116 and 118 and is formed of the same material forming a remainder of plate 108. Stated otherwise, stop 120 is integral with plate 108. For example, stop 120 is formed by lancing plate 108. Stop 120 is aligned with holes 116 and 118 in circumferential direction CD and extends past side 112 in direction AD1. Springs 110 are engaged with drive plate 104 and stops 120. Spring retainer plate 108 is arranged to partially surround springs 110 and retain springs 110 in a radially outward direction RD.

The discussion that follows is direct to a single spring 110; however, it should be understood that the discussion is applicable to each spring 110. Spring 110 includes circumferential ends 122 and 124 engaged with a pair of spring stops 120. For example, spring 110A is engaged with stop 120A and stop 120B.

Stop 120 includes end surface 126 proximate hole 116 and engaged with end 122 and end surface 128 proximate hole 118 and engaged with end 124. End surfaces 126 and 128 are aligned in direction CD. In an example embodiment, at least a portion spring stop 120 is continuous, in the circumferential direction CD, between end surfaces 126 and 128. In an example embodiment, an entirety of spring stop 120 is continuous, in the circumferential direction CD, between end surfaces 126 and 128.

Spring retainer plate 108 includes spring pockets 130, each pocket 130 is aligned with holes 116 and 118 in circumferential direction CD and misaligned with holes 116 and 118 with in radial direction RD. A respective spring 110 is located in each pocket 130. Pockets 130 curl partially about springs 110 and retain springs 110 in radially outward direction RD. End surfaces 126 and 128 are separated, in axial direction AD1, from side 112 by respective gaps 132.

Advantageously, end surfaces 126 and 128 are continuous, for example, from portion 136 of plate 108 radially inward of spring stops 120 to portion 138 of spring retainer plate 108 radially inward of stops 120. The continuity of surfaces 126 and 128 advantageously provide a more robust surface for engaging springs 110. In an example embodiment, a portion of spring stop 120 is continuous from portion 136 to portion 138. In an example embodiment as shown in FIG. 5, an entirety of spring stop 120 is continuous from portion 136 to portion 138.

In an example embodiment, spring retainer plate 108 includes spring stops 140. The discussion that follows is directed to a single stop 140 unless noted otherwise; however, it should be understood that the discussion is applicable to each stop 140. Stop 140 is formed of the same material forming spring stops 120, extends from side 112, is aligned with at least a portion of a spring stop 120 in radial direction RD, and is located outward of spring stops 120 in radial direction RD. Stop 140 includes ends 142 and 144. Circumferential ends 122 and 124 of spring 110 are engaged with ends 142 and 144, respectively. Thus, end 122 is engaged with end surface 126 of stop a 120 and end 142 of the a stop 140, and end 124 is engaged with end surface 128 of another stop 120 and end 144 of another stop 140. Stops 140 provide robust surfaces that cooperate with stops 120 to provide additional support for springs 110.

In an example embodiment, damper 102 is part of torque converter 100. Torque converter 100 includes: axis of rotation AR; cover 146 arranged to receive torque; impeller 148; turbine 150; stator 152; and lock-up clutch 154 with axially displaceable piston 156 arranged to non-rotatably connect drive plate 104 and cover 146. In an example embodiment, damper 102 includes springs 158 engaged with plate 108 and output flange 106. Output flange 106 is arranged to non-rotatably connect to an input shaft for a transmission. In an example embodiment, damper 102 includes cover plate 160 non-rotatably connected to turbine 150 and plate 108 and engaged with springs 158. In an example embodiment, damper 102 includes pendulum mass assembly 162 connected to cover plate 160.

Figure 8:
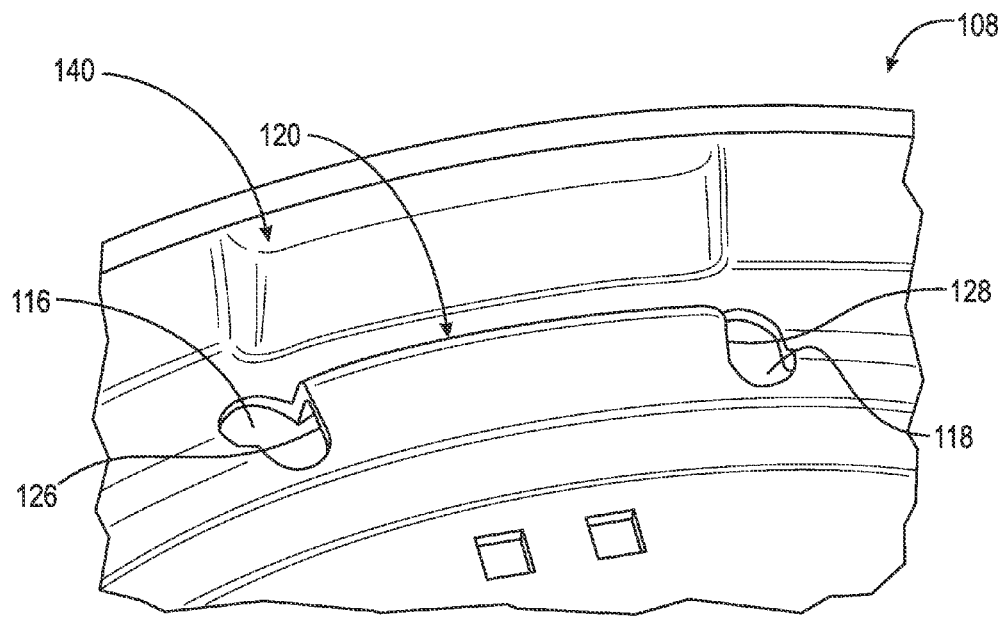
FIG. 8 is a detail of a front view of area 8/9 in FIG. 4.

FIG. 8 is a detail of a front view of area 8/9 in FIG. 4.

Figure 9:
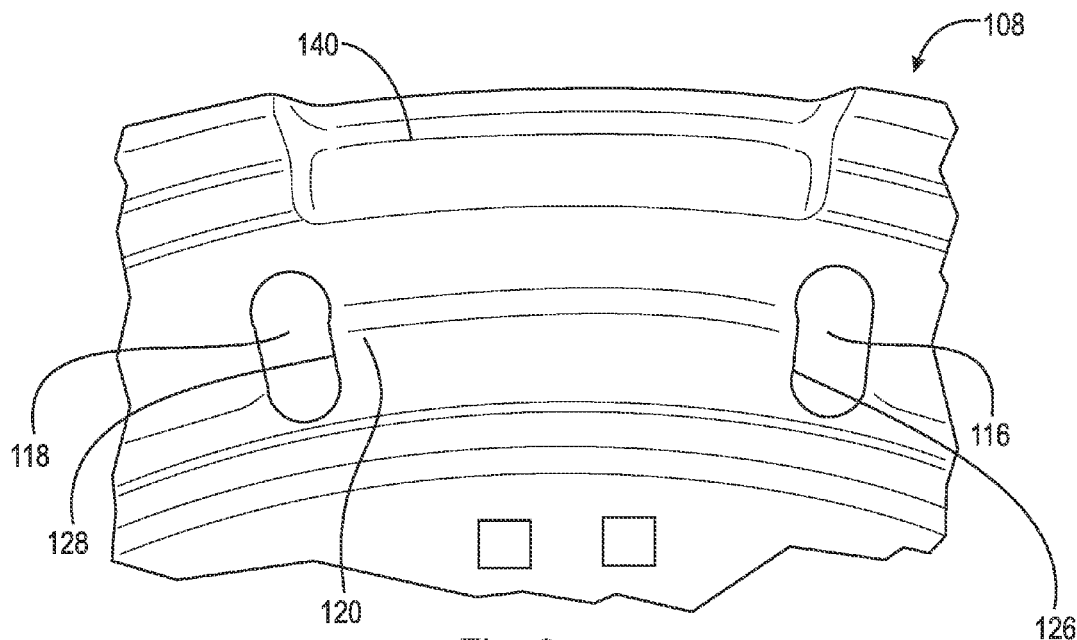
FIG. 9 is a detail of a back view of area 8/9 in FIG. 4.

FIG. 9 is a detail of a back view of area 8/9 in FIG. 4. FIGS. 8 and 9 are perspective views providing further detail regarding the configuration of stops 120 and 140.

Figure 10:
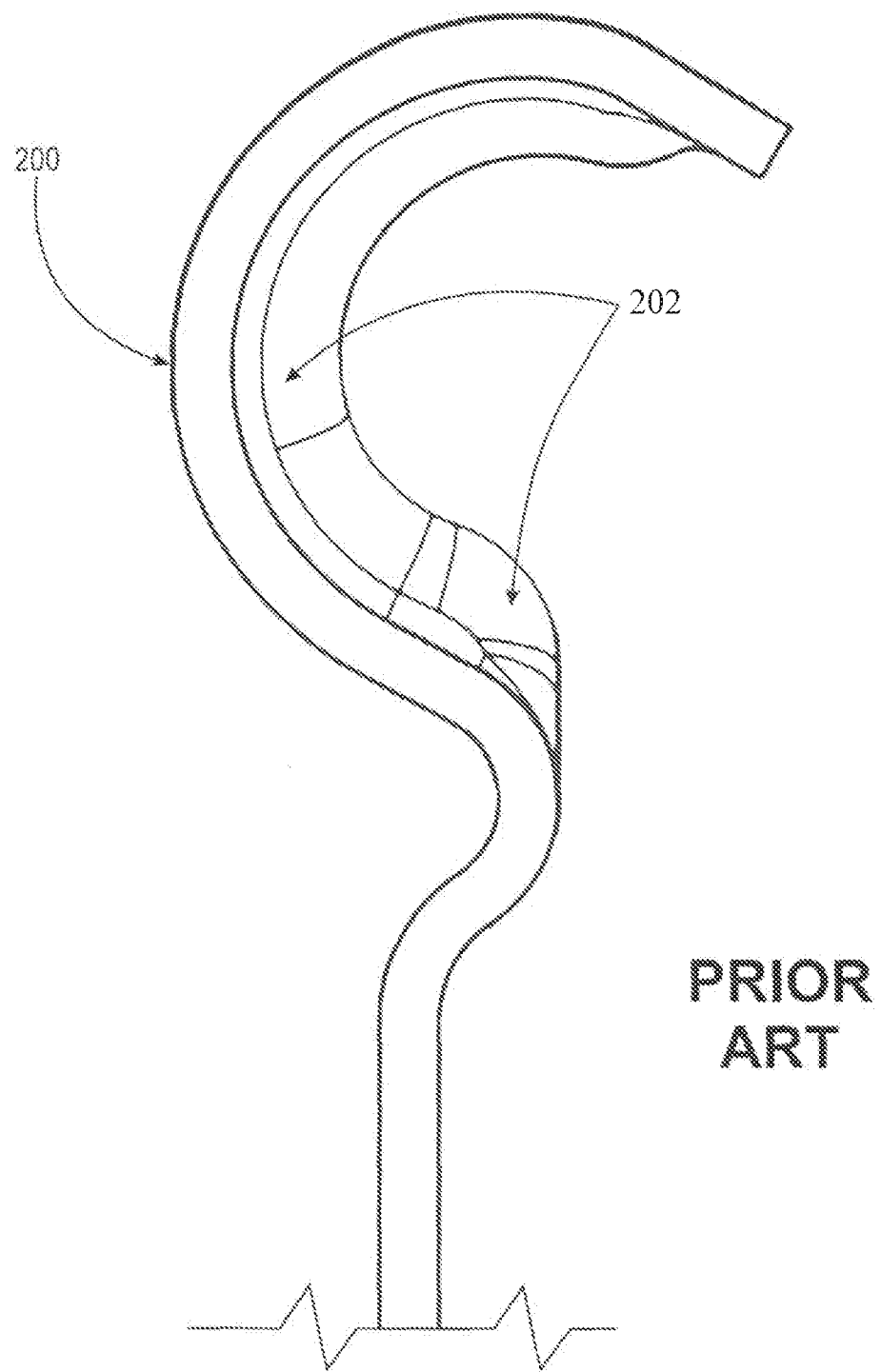
FIG. 10 is a partial cross-sectional view of a prior art spring retainer, for example, for a vibration damper.

Advantageously, lanced spring stop 120, in particular surfaces 126 and 128, provides a flat contact surface for spring 110, in particular, proximate the radially inner portion of arc springs 110. Stop 120, in particular surfaces 126 and 128, minimize bending stress at ends 122 and 124, respectively, of springs 110, improving durability of springs 110. Bending stress comes from, for example as described above in FIG. 10, end-caps 165 not sitting correctly on traditional formed stops due to corner radii (rounding). For example, portion 202 in retainer 200 in FIG. 10 is rounded, rather than presenting a radial surface such as surfaces 126 and 128 for accepting an end-cap. The pierced features, such as holes 116 and 118, are designed to distribute loading stress by matching the step height between the main retainer geometry and stops 120. This configuration better distributes stress around stops 120 and prevents material tear during the stamping/forming operations. To provide structural strength to damper 102 and plate 108 under centrifugal load, plate 108 includes circumferentially continuous rim 166 connecting pockets 130 to stops 140. Outer rim 166 distributes stress related to holes 116 and 118 and resists centrifugal loading, thus holding hoop stress forces from the mass of the springs during centrifugal loading of damper 102. To provide structural strength to damper 102 and plate 108 under centrifugal load, plate 108 includes blend radii connecting the stop height differences, creating a stiffened transition area between the main pocket and the stop, further reducing stress at the lanced tabs.

Lanced stops 120 also improve spring retention capabilities during function since springs 110 are not able to displace out of pockets 130 while torque is applied to damper 102, because each lanced stop 120 has surfaces 126 and 128 without corner radiuses as is the case with known stops. For example, as noted above, ideally, the end cap and spring should remain in circumferential alignment, with the end cap substantially co-planar with a plane passing through an axis of rotation for the spring retainer. Since surfaces 126 and 128 are co-planar with respective planes passing thought axis AR, surfaces 126 and 128 maintain the desired orientation of the end caps. That is, preventing the slipping and twisting of the end cap noted above.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torsional vibration damper, comprising:
an axis of rotation;
a drive plate arranged to receive torque;
an output flange;
a spring retainer plate including:
   a first side facing in a first axial direction;
   a second side facing in a second axial direction opposite the first axial direction;
   first and second pluralities of holes:
      passing through material forming the spring retainer plate and connecting the first and second sides; and,
      aligned with each other in a circumferential direction; and,
a first plurality of spring stops, each spring stop in the first plurality of spring stops:
   formed of a same material forming a remainder of the spring retainer plate;
   bounded, in the circumferential direction, by a respective pair of holes from the first and second pluralities of holes; and,
   extending from the first side at least partially in the first axial direction; and,
a first plurality of circumferentially disposed arc springs engaged with the drive plate and the first plurality of spring stops, wherein the spring retainer plate is arranged to partially surround the first plurality of arc springs and retain the first plurality of arc springs in a radially outward direction.

2. The damper of claim 1, wherein:
each arc spring in the first plurality of arc springs includes respective first and second circumferential ends engaged with a respective pair of spring stops from the first plurality of spring stops.

3. The damper of claim 1, wherein:
each arc spring in the first plurality of arc springs includes respective first and second circumferential ends;
said each spring stop in the first plurality of spring stops includes:
   a respective first end surface proximate one hole from the respective pair of holes and engaged with a respective first circumferential end; and, a respective second end surface proximate the other hole from the respective pair of holes and engaged with a respective second circumferential end.

4. The damper of claim 3, wherein the respective first and second end surfaces are aligned in the circumferential direction.

5. The damper of claim 3, wherein:
the spring retainer plate includes:
a first portion radially inward of the first plurality of spring stops; and,
a second portion radially outward of the first plurality of spring stops;
each first end surface is continuous from the first portion to the second portion; and,
each second end surface is continuous from the first portion to the second portion.

6. The damper of claim 1, wherein:
the spring retainer plate includes:
a first portion radially inward of the first plurality of spring stops; and,
a second portion radially outward of the first plurality of spring stops; and,
an at least a portion of said each spring stop in the first plurality of spring stops is continuous from the first portion to the second portion.

7. The damper of claim 6, wherein an entirety of said each spring stop in the first plurality of spring stops is continuous from the first portion to the second portion.

8. The damper of claim 1, wherein:
the spring retainer plate includes a plurality of first portions, each first portion:
aligned with the first and second pluralities of holes in the circumferential direction;
misaligned with the first and second pluralities of holes in a radial direction; and,
arranged to receive a respective arc spring from the first plurality of arc springs; and,
a respective arc spring from the first plurality of arc springs is located in each first portion.

9. The damper of claim 1, wherein:
said each spring stop in the first plurality of spring stops includes:
a respective first end surface proximate one hole from the respective pair of holes; and,
a respective second end surface proximate the other hole from the respective pair of holes; and,
at least a portion of said each spring stop in the first plurality of spring stops is continuous, in the circumferential direction, between the respective first and second end surfaces.

10. The damper of claim 9 wherein:
an entirety of said each spring stop in the first plurality of spring stops is continuous, in the circumferential direction, between the respective first and second end surfaces.

11. The damper of claim 1, wherein the spring retainer plate includes a second plurality of spring stops, each spring stop in the second plurality of spring stops:
formed of the same material forming the first plurality of spring stops;
extending from the first side;
aligned with at least a portion of a respective spring stop in the first plurality of spring stops in a radial direction; and,
located outward of the first plurality of spring stops in the radial direction.

12. The damper of claim 11, wherein:
each arc spring in the first plurality of arc springs includes respective first and second circumferential ends; and,
said each spring stop in the second plurality of spring stops includes:
a respective first end engaged with a respective first circumferential end; and,
a respective second end engaged with a respective second circumferential end.

13. A torsional vibration damper, comprising:
an axis of rotation;
a drive plate;
an output flange;
a spring retainer plate including:
a first side facing in a first axial direction;
a second side facing in a second axial direction opposite the first axial direction;
a first plurality of spring stops, each spring stop in the first plurality of spring stops:
formed of a same material forming a remainder of the spring retainer plate;
extending from the first side at least partially in the first axial direction;
including respective first and second circumferentially separated end surfaces separated, in the first axial direction, from the first side by first and second respective gaps; and,
a first plurality of arc springs, each arc spring in the first plurality of arc springs engaged with the drive plate and the spring retainer plate and including:
a respective first circumferential end engaged with a respective first end surface; and,
a respective second circumferential end engaged with a respective second end surface, wherein:
the spring retainer plate is arranged to:
partially surround the first plurality of arc springs;
retain the first plurality of arc springs in a radially outward direction; and,
retain the first plurality of arc springs in the second axial direction.

14. The damper of claim 13, further comprising:
first and second pluralities of holes:
passing through material forming the spring retainer plate and connecting the first and second sides;
aligned with each other in the circumferential direction; and,
open to the first and second respective gaps.

15. The damper of claim 13, wherein:
the spring retainer plate includes:
a first portion located inward of the first plurality of spring stops in a radial direction; and,
a second portion located outward of the first plurality of spring stops in the radial direction; and,
in a cross-section, orthogonal to the axis of rotation, of said each spring stop in the first plurality of spring stops, said each spring stop is continuous and free of a respective discontinuity, from a first portion to the second portion.

16. The damper of claim 13, wherein said each spring stop is continuous and free of a respective discontinuity from the respective first end to the respective second end.

17. A torque converter, comprising:
an axis of rotation;
a cover;
an impeller;
a turbine;
a stator;

a torsional vibration damper including:
  a drive plate;
  an output flange;
  a spring retainer plate including:
    a first side facing in a first axial direction away from the turbine;
    a second side facing in a second axial direction toward the turbine;
    first and second pluralities of holes:
      passing through material forming the spring retainer plate and connecting the first and second sides; and,
      aligned with each other in a circumferential direction;
    a first plurality of spring stops, each spring stop in the first plurality of spring stops:
      formed of a same material forming a remainder of the spring retainer plate;
      bounded, in the circumferential direction, by a respective pair of holes from the first and second pluralities of holes; and,
      extending from the first side at least partially in the first axial direction; and,
  a first plurality of circumferentially disposed arc springs engaged with the drive plate and the first plurality of spring stops; and,
a lock-up clutch arranged to non-rotatably connect the cover and the drive plate, wherein:
  the spring retainer plate is arranged to partially surround the first plurality of arc springs and retain the first plurality of arc springs in a radially outward direction; and,
  in a cross-section, orthogonal to the axis of rotation, of said each spring stop in the first plurality of spring stops, the spring retainer plate is continuous.

18. The torque converter of claim 17, wherein:
said each spring stop in the first plurality of spring stops includes:
  a respective first end surface proximate one hole from the respective pair of holes; and,
  a respective second end surface proximate the other hole from the respective pair of holes; and,
at least a portion of said each spring stop in the first plurality of spring stops is continuous, in the circumferential direction, between the respective first and second end surfaces.

19. The torque converter of claim 17, wherein:
the spring retainer plate includes a second plurality of spring stops, each spring stop in the second plurality of spring stops:
  formed of the same material forming the first plurality of spring stops;
  extending from the first side;
  aligned with at least a portion of a respective spring stop in the first plurality of spring stops in a radial direction; and,
  located outward of the first plurality of spring stops in the radial direction;
said each spring stop in the second plurality of spring stops includes respective first and second circumferentially separated end surfaces; and,
each arc spring in the first plurality of arc springs includes:
  a respective first circumferential end engaged with a respective first end surface; and,
  a respective second circumferential end engaged with a respective second end surface.

20. The torque converter of claim 19, wherein:
said each spring stop in the first plurality of spring stops includes:
  a respective third end surface proximate one hole from the respective pair of holes; and,
  a respective fourth end surface proximate the other hole from the respective pair of holes;
the respective first circumferential end is engaged with a respective third end surface; and,
the respective second circumferential end is engaged with a respective fourth end surface.

* * * * *